BEST AVAILABLE COPY

6

17,755

W. BREDE.

RATCHET DRILL.

No. 10,503.

Reissued Aug. 5, 1884.

WITNESSES:

F. McArdle.

C. Sedgwick

INVENTOR:

W. Brede

BY Munn & Co

ATTORNEYS.

N. Y. TYPE, Photo-Lithographer, Washington, D. C.

BEST AVAILABLE COPY

UNITED STATES PATENT OFFICE.

WILLIAM BREDE, OF HONOLULU, HAWAIIAN ISLANDS.

RATCHET-DRILL.

SPECIFICATION forming part of Reissued Letters Patent No. 10,503, dated August 5, 1884.

Original No. 292,280, dated January 22, 1884. Application for reissue filed June 20, 1884.

*To all whom it may concern:*

Be it known that I, WILLIAM BREDE, of Honolulu, Oahu, Hawaiian Islands, have invented a new and Improved Ratchet-Drill, of which the following is a full, clear, and exact description.

In my improved ratchet-drill a continuous rotary motion of the drill can be obtained by a forward-and-backward movement of the lever of the ratchet and the drill fed automatically at the same time, whereby drilling can be done quickly and readily.

The invention consists in a combination of bevel-gearing and ratchet mechanism for operating the drill and effecting the feed, as hereinafter described and claimed.

Reference is to be had to the accompanying drawings, forming part of this specification, in which similar letters of reference indicate corresponding parts in all the figures.

Figure 1:
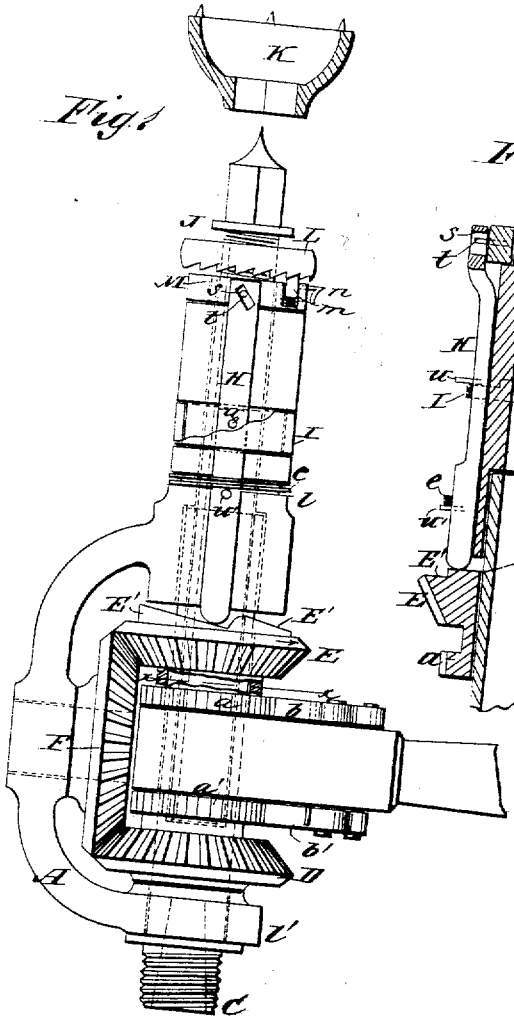
Figure 4:
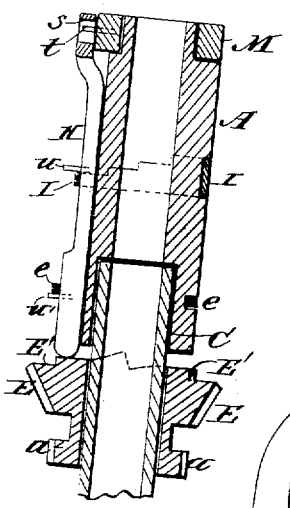
Figure 2:
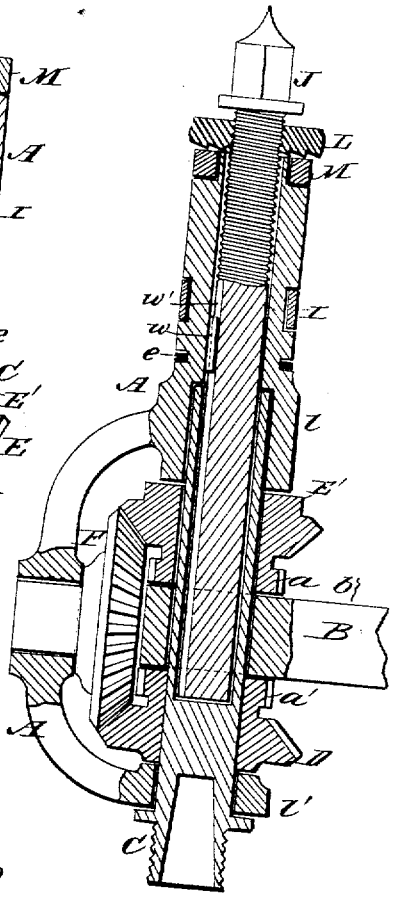
Figure 3:
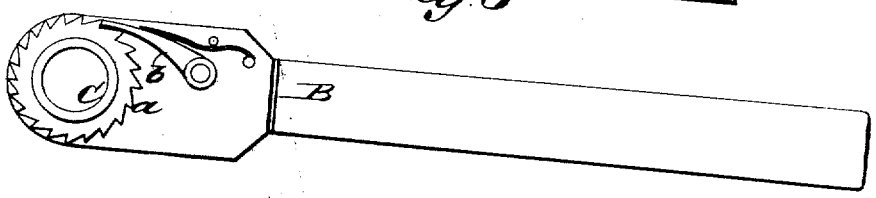

Figure 1 is a side elevation of my improved brace. Fig. 2 is a longitudinal section of the same, and Fig. 3 is a cross-section on line *x x* of Fig. 1. Fig. 4 is a detail sectional view showing the position of the slide and a sectional view of the cam.

A is the frame, formed with an upper bearing, *l*, and lower bearing, *l'*, connected by a side arm.

C is the spindle extending through the lower bearing, *l'*, and into the upper bearing, *l*.

J is a screw-stem, fitted loosely in the upper bearing, *l*, and extending at its lower end into the spindle C, which is formed hollow to receive the stem. The screw-stem is prevented from turning by a feather, *w*, on the frame A, while the feather *w* enters a slot, *w'*, in the screw-stem J.

On the upper end of the frame A is a loose [illegible]ar, M, beneath a nut, L, that is formed [illegible] ratchet-teeth on its under side.

[illegible] is a pawl, fitted in a recess in collar M, [illegible] forced upward by a spring into engage[illegible]t with the teeth on nut L.

[illegible] is a thumb-piece for depressing the pawl, [illegible]llow backward movement of the nut.

[illegible]xed on spindle C, above bearing *l'*, is a [illegible]el-pinion, D, and a ratchet-wheel, *a'*, that [illegible]st on the hub of the pinion.

E is a bevel-pinion loose on the spindle, and having a ratchet-wheel, *a*, on its hub, and on the spindle between the ratchet-wheels is hung the operating-lever B, provided with pawls *b* *b'*, engaging ratchet-wheels *a* *a'*, the teeth of which are in reverse.

F is a bevel-pinion, fitted loosely, as shown in Fig. 2 of the drawings, in the frame A, so as to engage the pinions D E. The upper side of pinion E is notched or toothed to form a cam, E', and on frame A is a slide, H, having its lower end engaging the cam of the pinion, while its upper end is made with an inclined slot, *s*, engaging a pin, *t*, projecting from collar M.

I is a cam-sleeve loose on frame A, supporting the slide H by a pin, *u*, projecting from the slide over the sleeve I, so that by turning the sleeve the slide H will be raised and lowered, and its length of movement by the cam thus regulated. A spring, *e*, in a groove around the frame A, bears on a pin, *u'*, projecting from the slide, for the purpose of keeping the slide down.

In the operation of the drill, lever B being moved in one direction, one pawl, *b*, acting on the ratchet-wheel *a*, rotates pinion E, and the motion is transmitted through pinions F D to spindle C. The lever, on its return movement, acts by pawl *b'* on the ratchet *a'*, thereby further rotating pinion D, and keeping up the movement of spindle C in the same direction as before.

In the movement of pinion E its cam-hub E' causes the rise of slide H more or less continuously, and a greater or less distance, according to adjustment of sleeve I, thereby moving collar M, and causing movement of nut L, so that the screw J is forced up at each rise of the slide. The return movement of the collar M is caused by spring *e*.

The upper end of screw J is squared to receive a concave cap, K, for holding the drill, and the cap is formed with points to prevent its revolving while drilling.

Having thus described my invention, what I claim as new, and desire to secure by Letters Patent, is—

1. In ratchet-drills, the combination of cam-pinion E, slide H, collar M, nut L, and screw J, substantially as shown and described.

2. In ratchet-drills, the cam-sleeve I, combined with slide H, cam-pinion E, and collar M, substantially as and for the purpose specified.

3. In ratchet-drills, the spring *e*, combined with feed-slide H, having a pin thereon, and cam-pinion E, as and for the purpose specified.

The foregoing specification of my improvement in ratchet drill-brace signed by me this 19th day of May, 1884.

W. BREDF.

Witnesses:
CHAS. BENT,
C. C. COLEMAN.